Patented May 2, 1944

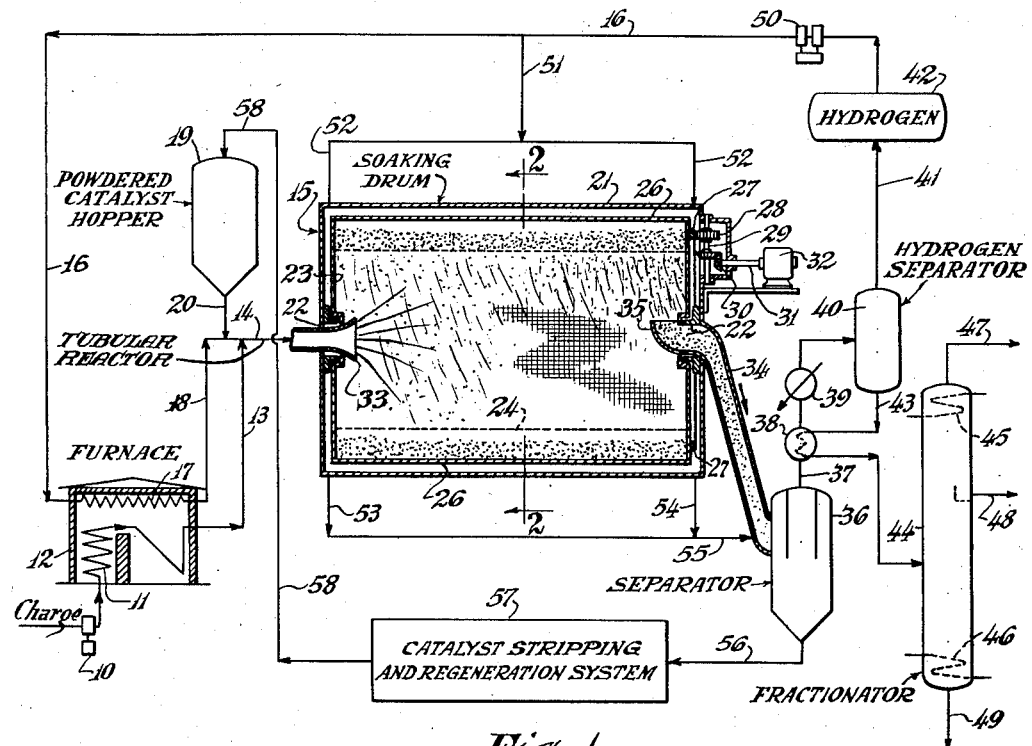

2,347,747

UNITED STATES PATENT OFFICE 2,347,747

SUSPENDED CATALYST TECHNIQUE

Ralph M. Mclaven, Highland, Ind., assignor to Standard Oil Company, Chicago, Ill., a corporation of Indiana Application December 30, 1939, Serial No. 311,813

8 Claims. (Cl. 196—52)

This invention relates to the catalytic conversion of hydrocarbons into high quality motor fuel and it pertains more particularly to an improved suspended catalyst technique. The invention is applicable to various catalytic conversion processes such as catalytic cracking, isomerization, alkylation, polymerization, desulfurization, etc., but it is particularly useful in processes of catalytic reforming, aromatization, hydrogenation and dehydrogenation wherein it is desirable for the vapors undergoing reaction to come in contact with a large catalyst surface area.

There are at least three distinct types of systems for effecting catalytic conversion of hydrocarbons; (1) the stationary type which comprises a fixed catalyst bed through which gases or vapors flow; (2) the moving bed type which comprises means for continuously or intermittently introducing and withdrawing catalyst from a reaction chamber during the course of the reaction and (3) the catalyst suspension type wherein powdered catalyst is carried through the system suspended in the gases or vapors undergoing treatment. Each of these systems is characterized by certain advantages and certain disadvantages. An object of this invention is to provide an improvement in powdered catalyst technique in order to overcome certain disadvantages of suspended catalyst systems and to obtain in such systems certain advantages which have heretofore been obtained only in the fixed bed and moving bed systems.

Suspended catalyst systems are necessarily concurrent in operation and they lack advantages obtainable by countercurrent flow of hydrocarbon vapors and catalyst. In suspended catalyst systems each particle of catalyst is carried along with the vapors in the hot vapor stream. Only a limited amount of catalyst can be suspended in the vapors and since the catalyst itself is moving through the reactor at substantially the same velocity as the vapors, hydrocarbon molecules have a much more limited opportunity of contacting catalyst surfaces than they have for instance in a fixed or moving bed system. An object of my invention is to provide a suspended catalyst process wherein each molecule of hydrocarbon vapor has a chance to contact the large catalyst surface ares such for instance as it would have a chance to contact in fixed or moving bed systems. In the moving bed systems where the vapors flow through a relatively large mass of catalyst material each molecule of vapor has an opportunity to come repeatedly in contact with different catalyst surfaces as it flows through the bed; my object is to accomplish this end in a powdered catalyst system.

Some catalyst materials have high initial activities and their action is almost instantaneous while others require a certain time factor in order to effect the desired conversion. My object is to obtain this desired time factor with permissible catalyst-to-oil ratios in suspended catalyst systems. In other words, my object is to provide a "soaking drum" for suspended catalyst processes.

The space velocity of the flow of hydrocarbon vapors through a catalyst is usually defined as the volume of hydrocarbon on a liquid basis (Vo) per volume of catalyst (assuming it is at rest) in the reactor (Vc) per hour and in many such systems this space velocity must be of the order of about 0.5 to 2.0 Vo/Vc/hr. In powdered catalyst systems the volume of catalyst in the reactor at any instant has heretofore been rather small. If the suspended catalyst in the system were allowed to come to rest it would occupy perhaps only about 5% of the volume of the reactor, while in fixed or moving bed systems the volume of catalyst may be substantially equivalent to the volume of the reactor.

For catalytic reforming in the presence of hydrogen in a powdered catalyst system the space velocity should be about 0.1 to 10 and preferably about 0.2 to 3 volumes of oil per volume of catalyst (assuming the catalyst to be at rest) per hour. This means that a very small amount of hydrocarbon vapors must suspend an extremely large amount of powdered catalyst material and it has been practically impossible in any prior system of commercial feasibility to inject this large an amount of powdered catalyst into the reaction chamber and to maintain the catalyst in suspension in the hydrocarbon vapors without plugging the reaction tubes. An object of my invention is to provide a method for obtaining the desired low space velocities in powdered catalyst systems, i. e., to maintain sufficient powdered catalyst suspension in the reaction zone to obtain a space velocity of about 0.1 to 10 and preferably 0.2 to 3 volumes of oil per volume of catalyst (assuming the catalyst to have come to rest) per hour.

A further object of my invention is to utilize positive means for insuring uniformity of catalyst reaction and catalyst regeneration. Other objects of the invention will be apparent from the following detailed description.

In practicing my invention a powdered catalyst is suspended in hot hydrocarbon vapors and passed concurrently therewith through a transfer line or primary conversion zone to an enlarged "soaking zone." In order to obtain uniform conversion in the soaking zone I continuously return the catalyst from the bottom of said zone to the top thereof and thus continuously maintain the zone full of suspended catalyst while the hydrocarbon vapors are flowing through said zone at a lower velocity than would be required for maintaining the catalyst particles in suspension. In one modification of my invention I utilize a rotating drum which carries catalyst from the base of the soaking zone to the top thereof and constantly redistributes the catalyst throughout the entire zone while hydrocarbon vapors pass slowly from one side of the zone to the other. In another modification I maintain constant mixing and recycling of the catalyst material by converging catalyst from the base of a vertical chamber to the top thereof, preferably by a blower, so that substantially countercurrent contact of hydrocarbons with suspended catalyst is obtained.

A feature of my invention is the continuous withdrawal of representative portions of the catalyst material for regeneration, provision being made for permitting the coarser catalyst particles to remain in the soaking drum for a longer period of time than the finer particles in order that the full effectiveness of all of the catalyst may be utilized before it is regenerated. Other features of the invention will be apparent from the following detailed description.

In the accompanying drawing which form a part of this specification and in which similar parts are designated by like reference characters—

Figure 1 is a schematic flow diagram of a catalytic reforming system showing one modification of the soaking drum in vertical section;

Figure 2 is a cross section along the lines 2—2 of the soaking drum illustrated in Figure 1;

Figure 3 is a cross section of a modified soaking drum of the same general type as that shown in Figure 1; and Figure 4 is a schematic vertical section of a modified type of soaking drum wherein the mechanical recirculation of powdered catalyst is effected by a conveyor instead of by a rotating drum.

While the invention is applicable to a wide variety of hydrocarbon conversion processes, I will describe preferred embodiments as applied to the process of catalytic reforming. The preferred catalyst for this process is a group VI metal oxide supported on active alumina, such for example as about 6% to 10% of molybdenum oxide impregnated or otherwise mounted on the alumina support. It should be understood, however, that no invention is claimed in any particular catalyst per se and that any catalysts may be employed which are known to be effective for obtaining the desired conversion. For cracking, natural or synthetic clays such as acid-treated bentonite (Super Filtrol) or metal oxides deposited on silica gel are among the catalysts of outstanding effectiveness and they may be prepared by any known method. For my process the catalyst is preferably in powdered form, i. e., less than 200 mesh and preferably less than 300 mesh in particle size. The exact particle size, however, is not controlling since the invention is applicable to any catalyst which may be suspended in the hydrocarbon vapors undergoing conversion.

The charging stock, which for example may be of 450° F. end point virgin heavy naphtha is charged by pump 10 to coils 11 of furnace 12 wherein it is heated to a temperature of about 900 to 1050° or 1100° F. under a pressure which may range from atmospheric to about 400 pounds per square inch but which is preferably about 200 pounds per square inch. The hot hydrocarbon vapors are discharged through transfer line 13 to tubular reactor 14 which in turn discharges into soaking drum 15.

Simultaneously hydrogen from line 16 is heated in coils 17 under about the same pressure and the same or slightly higher temperature, the hot hydrogen from transfer line 18 preferably being employed to disperse powdered catalyst into tubular reactor 14. The powdered catalyst from hopper 19 may be fed by a screw conveyor or other conventional means through line 20 to tubular reactor 14 and while it is preferably suspended in the hydrocarbon vapors by means of the superheated hydrogen, it may be suspended therein by an other conventional means. I prefer to employ about ½ to 8 mols of hydrogen per mol of hydrocarbon and the hydrogen may contain appreciable amounts, i. e., from about 10% to 60% of hydrocarbon gases or other inert impurities. The catalyst-to-oil ratio as charged to the reactor is about 0.5 to 6, preferably about 1 to 4, and will, of course, depend on the physical structure of the catalyst, as large an amount being suspended in the vapors as is practically feasible.

The time of contact in tubular reactor 14 may vary within fairly wide limits but is preferably of the order of about 1 to 10 seconds since a large part of the reaction is effected in soaking drum 15.

The soaking drum illustrated in Figure 1 consists of a pressure vessel 21 which is preferably cylindrical and which may be either horizontal or slightly inclined from the horizontal. Rotatably mounted on bearings 22 in this vessel are disks 23 which act as closures for cylindrical screen 24 which is of smaller diameter than the diameter of the cylindrical vessel 21. Longitudinal and radial plates 25 (see Figure 2) are secured to said screen and extend therefrom either to the inner surface of chamber 21 or to an inner cylindrical member 26 which is likewise secured at its ends to disks 23.

One of the disks 23 is provided with an annular gear 27 meshing with pinion 28 mounted on shaft 29 which is driven by the beveled gears 30. A shaft 31 connected to one of the beveled gears 30 passes through the end wall of chamber 21 through a suitable packing gland. Shaft 31 is driven by motor 32 for slowly rotating the cylindrical screen 24 on bearings 22.

The suspended catalyst, together with hydrocarbon vapors and hydrogen are introduced through flared nozzle 33 into the open space bounded by screen 24 and end plates 23. The vapor velocity in this enlarged soaking zone is markedly decreased so that a major part of the suspended catalyst drops out of the vapors and falls to the base of the zone, passing through the lower part of tubular screen 24 into the spaces between plates 25. The rotation of tubular screen 24 causes plates 25 to carry the powdered catalyst from the bottom to the top of this soaking zone and as the screen rotates the catalyst rains down through the screen so that the entire space within the tubular screen is constantly filled with this rain of powdered catalyst. The size of the screen openings and the speed of rotation of the screen are so regulated that catalyst is caused to rain throughout the whole area in the soaking zone. If outer wall 26 is omitted plates 25 may bear against the inner wall of cylindrical chamber 21, but I prefer to avoid this wiping action and to employ cylinder 26 to serve as a base for the catalyst compartments defined by plates 25.

The gases and vapors pass slowly from inlet 33 to outlet pipe 34 so that as the catalyst repeatedly rains down through the soaking zone it is gradually moved from the inlet to the outlet side thereof. The finest catalyst particles which are most quickly spent will be carried through the soaking zone without appreciable settling and carried by the outlet vapors into discharge pipe 34. The heavier catalyst particles will drop to the bottom of the soaking zone, be carried to the top and again dropped to the bottom, etc., and the rate at which they move to the discharge end of the zone will depend upon their relative mass. Thus the larger catalyst particles which should maintain their activity for the longest period of time are maintained in the reaction zone for a longer period of time than the lighter particles which are more quickly spent. Inclined baffle 35 catches any of the heavier particles at the discharge end which might not otherwise be carried into discharge line 34 by the moving gases and vapors. It will thus be seen that I have not only utilized a soaking zone which will permit the necessary space velocity of about 0.2 to 10 or preferably 0.2 to 5 volumes of charging stock (liquid basis) per volume of catalyst (i. e., space occupied by catalyst if allowed to come to rest) per hour, but I have utilized a means whereby catalyst particles of various size are removed from the soaking drum after each particle has contributed its maximum effectiveness.

The vapors and catalyst material withdrawn through line 34 are then passed into cyclone separator 36 for removing suspended catalyst from said gases and vapors, it being understood, of course, that a number of such cyclone separators or other conventional means may be employed for effecting this catalyst separation.

Gases and vapors are withdrawn from separator 36 through line 37, heat exchanger 38 and cooler 39 to hydrogen separator 40. Hydrogen is withdrawn from the separator through line 41 to hydrogen storage tank 42. Liquids from the base of the separator are withdrawn through line 43 and heat exchanger 38 to fractionating column 44.

Any conventional type of fractionating equipment may be employed and in the accompanying drawing such equipment is illustrated by a column containing reflux coils 45 and reboiler coils 46, the normally gaseous hydrocarbons being taken overhead through line 47, the gasoline fraction being withdrawn through line 48 and the heavier-than-gasoline fraction, sometimes called "polymers" being withdrawn through line 49.

Hydrogen (with or without hydrocarbon gases such as methane, ethane, etc.) from tank 42 is returned to line 16 by means of compressor 50. In order to prevent any powdered catalyst from accumulating between disks 23 and the end walls of chamber 21 I may introduce hydrogen from line 16 through line 51 and branched lines 52 into such spaces. This hydrogen will sweep out any catalyst particles through lines 53 and 54 and the catalyst particles thus blown out of the system may be returned by line 55 to the cyclone separator 36.

The catalyst removed from gases and vapors in separator 36 are withdrawn through line 56 to suitable stripping and regenerating means 57 and returned by line 58 to powdered catalyst hopper 19. The stripping and regeneration of the catalyst may be effected by any conventional means and will not be described in further detail. The apparatus and method used in the on-stream reaction may also be used for regeneration, an oxygen-containing flue gas being substituted for the hydrocarbons. Marked advantages in regeneration may thus be obtained.

It should be understood that instead of employing a cylindrical screen for maintaining the uniform rain of catalyst particles throughout the soaking zone I may employ any other equivalent means of picking up catalyst from the base of the zone and redistributing it again at the top of said zone. Thus in Figure 3 I have illustrated a rotating inner cylinder 26 provided with curved vanes 59 for conveying the powdered catalyst to the upper part of the zone and redistributing it. These curved vanes may be made of screen material in order that the catalyst discharged from the top of the zone may be in the form of a uniform rain instead of in the form of sheets, or the curvature of the vanes may be so proportioned as to effect the desired uniformity of catalyst discharge throughout the entire soaking zone.

Instead of employing a cylindrical horizontal soaking drum I may employ a vertical soaking drum (Figure 4) and mechanically convey the catalyst which settles to the base of this zone back to the top of the zone by means of any conventional conveying system. Thus vertical reaction chamber 60 is provided with a hopper bottom 61 leading to discharge conduit 62. A suitable transfer means 63 forces the catalyst back through line 64 to an upper part of the reaction chamber 60; where sufficient gases and vapors remain admixed with the catalyst in 62 this conveying means may be a simple blower. Alternatively, a screw conveyor or any other mechanical means may be employed.

Gases and vapors containing the finest catalyst particles are taken overhead through line 65 to cyclone separator 36. The heavier catalyst particles may be withdrawn in desired amounts from line 62 or line 64 by means of line 66 through rotary valve or screw feeder 66a. Thus in this modification as well as in the previous modifications I make provision for the removal in aliquot parts of the heavier catalyst particles as well as the light catalyst particles. The embodiment of the invention illustrated in Figure 4 provides for actual countercurrent flow of powdered catalyst with hydrocarbon vapors undergoing treatment.

It should be understood, of course, that instead of having the means for transferring the catalyst from the lower part to the upper part of the chamber on the outside of the chamber it may equally well be located on the inside of the chamber, and any mechanical conveying means may be employed instead of the blower which is shown in the drawing.

While I have described preferred embodiments of my invention it should be understood that these illustrations are only by way of example and that many other modifications and alternative processes fall within the scope of the invention.

I claim:

1. The method of operating a catalytic hydrocarbon conversion system employing powdered catalyst which method comprises suspending said powdered catalyst in a gas or vapor stream, introducing said suspended catalyst stream into a zone of large cross-sectional area at a point spaced from the top and bottom of said zone, maintaining a vapor velocity in said zone sufficiently low to permit appreciable settling of the catalyst particles therein to a point below that at which the suspended catalyst stream is introduced, withdrawing gases or vapors from said zone at a point spaced from the point at which the suspended catalyst stream is introduced, continuously recycling settled catalyst from the point below the suspended catalyst stream introduction to a point above the point of suspended catalyst stream introduction and separating catalyst particles from gases or vapors withdrawn from said zone.

2. The method of operating a catalytic hydrocarbon conversion system employing powdered catalyst which method comprises suspending said powdered catalyst in a gas or vapor stream, introducing said suspended catalyst stream at a low point into a zone of large cross-sectional area, maintaining a gas or vapor velocity in said zone sufficiently low to permit appreciable settling of catalyst particles therein to a point below that at which the suspended catalyst stream is introduced, recycling a part of the settled catalyst from the point below the suspended catalyst stream introduction to a point above said introduction, downwardly withdrawing another part of said settled catalyst, withdrawing gases or vapors together with suspended catalyst particles from said zone at a point spaced from the point at which the suspended catalyst stream is introduced thereto, commingling said last-named withdrawn catalyst particles with downwardly withdrawn settled catalyst particles and separating gases or vapors from withdrawn catalyst particles.

3. The method of regenerating spent catalyst which has become coated with combustible carbonaceous material which method comprises introucing said spent catalyst with a hot gas containing a small amount of oxygen into an enlarged contacting zone, maintaining a sufficiently low gas or vapor velocity in said contacting zone to permit a substantial quantity of the catalyst to settle to a point below the introduction point, recycling said catalyst from the point below that at which spent catalyst is introduced to a point above that at which spent catalyst is introduced thereto and withdrawing regeneration gases from said zone at a point spaced from the point of spent catalyst introduction.

4. The method of regenerating spent powdered catalyst which has become coated with combustible carbonaceous material which method comprises suspending said spent catalyst in a hot gaseous stream, introducing said suspended catalyst stream at a low level into an enlarged regeneration zone together with a small amount of oxygen, maintaining a gas velocity in said regeneration zone sufficient to maintain the lightest catalyst particles in suspension and to permit the heaviest catalyst particles to settle downwardly, withdrawing downwardly settled catalyst particles from said zone, returning a part of the downwardly settled catalyst to the upper part of said zone, withdrawing regeneration gases together with suspended catalyst particles from said zone, commingling said last-named withdrawn catalyst particles with that part of the downwardly withdrawn settled catalyst particels which is not recycled to the regeneration zone and separated regeneration gases from withdrawn catalyst particles.

5. In a catalytic hydrocarbon conversion system employing suspended catalyst particles the method of obtaining intimate contact of gases or vapors with large amounts of catalyst surfaces which method comprises suspending a finely divided granular catalyst in a gas or vapor stream introduced at a low point in an enlarged contacting zone, maintaining a gas or vapor velocity in said contacting zone to permit settling of a portion of the catalyst particles while maintaining another portion of the catalyst particles in suspension, removing settled catalyst particles from the contacting zone, externally recycling a part of the removed settled catalyst particles back to the contacting zone, and distributing the externally recycled part of the settled catalyst particles in the contacting zone above the point at which said gas or vapor stream is introduced thereto.

6. In a catalytic hydrocarbon conversion system employing a powdered catalyst containing fine and coarse particles substantially all of which are less than 200 mesh in particle size, the method of operation which comprises suspending such powdered catalyst in a hydrocarbon vapor stream, introducing said stream and suspended catalyst at a low point in an enlarged vertical contacting zone, maintaining operating conditions in said contacting zone for effecting substantial conversion of said hydrocarbons into reaction products of different characteristics, withdrawing reaction products together with fine catalyst particles from the top of said reaction zone, settling and downwardly withdrawing coarse catalyst particles from said reaction zone at a point below the point at which said suspended catalyst stream is introduced thereto, returning a portion of the coarse catalyst particles from the lower to the upper part of the contacting zone, separating fine catalyst particles from reaction products and commingling said fine particles with the unrecycled portion of said downwnwardly withdrawn coarse particles whereby the fine and coarse catalyst particles may be simultaneously regenerated while in a commingled state and fractionating the vapors from which the fine and coarse particles have been separated.

7. The method of operating a catalytic hydrocarbon conversion system employing powdered catalyst substantially all of which is less than 200 mesh in particle size, which method comprises suspending said powdered catalyst in a hydrocarbon vapor stream introduced at the base of a vertical conversion zone, maintaining a vapor velocity in said conversion zone sufficiently low to permit appreciable settling of a substantial portion of the catalyst particles therein, maintaining in said conversion zone for each volume per hour of liquid oil charged thereto about .2 to 5 volumes of catalyst measured in settled condition, withdrawing vapors and unsettled catalyst particles from the top of the conversion zone, downwardly withdrawing settled catalyst particles from the conversion zone, recycling a portion of the downwardly withdrawn catalyst particles from the lower part of the conversion zone to the upper part thereof, commingling another portion of the downwardly withdrawn settled catalyst particles with unsettled catalyst particles, and separating vapors from the commingled catalyst particles.

8. The method of handling spent powdered catalyst having a particle size below 200 mesh which method comprises suspending said spent powdered catalyst in a gas or vapor stream introduced at the base of a vertical contacting zone, maintaining an upward vertical gas or vapor velocity in said contacting zone sufficiently low to permit appreciable settling of a portion of the catalyst particles, withdrawing a stream of suspended catalyst particles together with gas or vapor from an upper part of said contacting zone, downwardly withdrawing a stream of settled catalyst particles from a lower point in said contacting zone, recycling a portion of the settled catalyst particles downwardly withdrawn from said contacting zone back to the contacting zone for distribution in gas or vapor above the point of initial catalyst introduction, and commingling another portion of the settled catalyst downwardly withdrawn from the contacting zone with catalyst particles removed from said zone in gas or vapor suspension.

RALPH M. MELAVEN.